US009392259B2

(12) United States Patent
Borowski

(10) Patent No.: US 9,392,259 B2
(45) Date of Patent: Jul. 12, 2016

(54) 2D/3D REAL-TIME IMAGER AND CORRESPONDING IMAGING METHODS

(75) Inventor: André Borowski, Rue Cherbuliez (CH)

(73) Assignee: FASTREE3D S.A., Ecublens (CH)

( * ) Notice: Subject to any disclaimer, the term of this patent is extended or adjusted under 35 U.S.C. 154(b) by 623 days.

(21) Appl. No.: 13/995,697

(22) PCT Filed: Dec. 21, 2011

(86) PCT No.: PCT/EP2011/073687
§ 371 (c)(1),
(2), (4) Date: Jul. 25, 2013

(87) PCT Pub. No.: WO2012/085151
PCT Pub. Date: Jun. 28, 2012

(65) Prior Publication Data
US 2013/0293681 A1    Nov. 7, 2013

(30) Foreign Application Priority Data

Dec. 23, 2010   (EP) .................................... 10196702

(51) Int. Cl.
*H04N 15/00*    (2006.01)
*H04N 13/04*    (2006.01)
*H04N 9/47*    (2006.01)
*H04N 13/02*    (2006.01)
*G01S 7/483*    (2006.01)
*G01S 17/89*    (2006.01)

(52) U.S. Cl.
CPC ............ *H04N 13/0203* (2013.01); *G01S 7/483* (2013.01); *G01S 17/89* (2013.01)

(58) Field of Classification Search
None
See application file for complete search history.

(56) References Cited

U.S. PATENT DOCUMENTS

| 4,229,103 | A | 10/1980 | Hipp | |
|---|---|---|---|---|
| 5,892,575 | A | 4/1999 | Marino | |
| 8,217,327 | B2* | 7/2012 | Kim | G01S 7/483 250/208.1 |
| 2002/0143506 | A1* | 10/2002 | D'Aligny | G01B 11/002 703/6 |
| 2004/0021852 | A1 | 2/2004 | DeFlumere | |
| 2006/0192086 | A1* | 8/2006 | Niclass | H01L 31/107 250/214.1 |
| 2007/0014551 | A1* | 1/2007 | Fujisawa | G03B 37/02 396/20 |
| 2007/0182949 | A1 | 8/2007 | Niclass | |
| 2011/0222757 | A1* | 9/2011 | Yeatman, Jr. | G06T 7/0075 382/154 |
| 2013/0300838 | A1* | 11/2013 | Borowski | G01S 7/486 348/46 |
| 2013/0300840 | A1* | 11/2013 | Borowski | G01S 7/483 348/50 |

OTHER PUBLICATIONS

International Search Report, dated Mar. 14, 2012, from corresponding PCT application.
European Search Report, dated May 20, 2011, from corresponding European application.

* cited by examiner

*Primary Examiner* — Frederick Bailey
*Assistant Examiner* — Talha M Nawaz
(74) *Attorney, Agent, or Firm* — Young & Thompson

(57) ABSTRACT

The present invention relates generally to methods and devices of generating an electrical representation of at least one object in a scene in the real word. The detail real-time imager for the representation of a scene of a real world comprises:—at least an illuminator (0501-0511) of said scene providing at least a series of ultra-short power laser pulses with time-related positions; and—a receiver (0515-0523) of a SPAD Single Photon Avalanche Diode detector array according to the method of the invention and associated to at least said series of ultra-short power laser pulses of said illuminator.

39 Claims, 4 Drawing Sheets

2D/3D REAL-TIME IMAGER AND CORRESPONDING IMAGING METHODS

TECHNICAL FIELD

The present invention relates generally to a real-time imager containing an illuminating device. That device illuminates a scene with ultra-short laser pulses which are temporally arranged in the form of predetermined illumination patterns. It relates also to imaging methods for acquiring scenes in a large range of directions.

BACKGROUND OF THE INVENTION

Existing 2D/3D imagers use natural light, flash light, artificial lighting, infrared illuminators, or pulsed laser illuminators emitting comparatively long (nanosecond) pulses. Those illuminators send light to the expected targets. A tiny fraction of this light is reflected towards the sensor part of the imager. 2D imagers do not suffer from intrinsic speed limitations, but only sensitivity limits. 3D sensors have significant speed limits due to the round-trip time of the emitted light between the imager and the target. This is aggravated by the significant settling time (dead time) required by most 3D sensors.

For example, time-of-flight (ToF) imagers frequently use many thousands of pulses separated by more than the ToF to image a single 3D scene. This sets stringent limitations to the achievable frame rate and thus also to the capability of imaging moving targets.

Existing imagers use fixed direction optics or motorized moving optical systems to acquire 2D/3D data of a scene. The very high resolution of some sensors, such as the 120 megapixels of the latest Canon CCD, seems to be a powerful imaging solution, but even the best existing sensors, even possibly acting in groups, could not actually provide a high resolution for 2D/3D scenes in a wide range of viewing directions and distances.

The inventors have found that imagers which are only electronically controlled appear to be unable to attain such a result. They have designed a rotating optical device for detailed imaging of scenes.

However, the lifetime of existing motorized optics is actually limited to a few hundred thousand cycles of movements. Therefore, continuous movements are impossible due to mechanical wear.

SUMMARY OF THE INVENTION

An aim of the present invention is to provide a 2D/3D detail real time imager with enhanced speed, distance and resolution capabilities.

Another aim of the invention is to catch on precise points with azimuth, elevation and distance coordinates, as many as possible data per second to attain this target, the 2D/3D detail real-time imager comprises the following:

The 3D imager will use at least an illuminating device (illuminator) which is provided with a means for generating programmable ultra-short laser pulses. For each pulse, there is a time reference based on at least one series of pulses. The 2D imager will use either illuminating devices already present in the room or conventional illuminating devices as used for imagers.

There is at least a receiving device (receiver) containing an array of detectors for the reflected laser pulses. Said array of detectors cooperates with means for data processing to acquire image data accordingly in two or three dimensions, one of them being a depth dimension based on measuring time-of-flight data contained in the reflected laser pulses.

Both the illuminator and the receiver cooperate with a viewfinder mechanism having wear-free moving optics to scan at least a part of the scene to be imaged. The receiver contains an imaging device which receives from it an image signal. The present invention provides especially a 3D detail real-time imager.

The invented imager comprises:
an illuminator comprising:
  means for generating at least one series of ultra-short laser pulses generated with at least one laser source emitting at least one given wavelength,
a receiver comprising:
  optical and mechanical means for receiving a flow of light from the illuminated scene when the said illuminator is operative; and
  means coupled to the said optical and mechanical means for receiving a flow of light and for generating a signal representing the targeted scene on the basis of the reflected light from the scene impinging at least one SPAD detector array; said means generating a signal representing the targeted scene and being coupled to an imaging part under at least one programmed controller, characterized in that the ultra short laser pulses are generated through an electronically controlled modulator to form packets of pulses into the said series of pulses, under control of a means for controlling said means for generating at least a series of ultra short laser pulses; and that the illuminator comprises optical and mechanical means coupled to said means for generating at least one series of ultra-short laser pulses for producing at least a predetermined spatial pattern of illumination of a scene onto at least a restricted area in azimuth and/or in elevation.

The present invention also provides methods for imaging 3D scenes using at least one 3D real-time imager as described above. The method comprises of the following:

A series of ultra-short laser pulses with high mutual temporal coherence is generated.

Beams of ultra-short laser pulses are sent in specific angular directions for illuminating a restricted area of a scene to be imaged, both in terms of azimuth and elevation.

Reflected laser pulses are received by a SPAD (single-photon avalanche diode) detector array. 3D coordinates of each illuminated dot of the illuminated scene are derived from the detected time of flight corresponding to each detection event on the SPAD array, also taking into account the related angle of the illuminated dot of the scene. The data are locally processed such that they are filtered, blanked, averaged both in time and/or in neighboring SPAD cells clustered in macrocells, compressed and/or transmitted to other electronic devices.

The present invention relates to a method for acquiring 3D scenes from at least such an invented 3D detail real-time imager. The method comprises steps of:

generating time series of at least a wavelength of a time series of ultra-short power laser pulses;

forming beams of ultra-short power laser pulses generated at different angles for illuminating a restricted area of a scene to be imaged, both in azimuth and elevation;

receiving reflected laser pulses onto at least a SPAD detector array and deriving 3D coordinates of each illuminated dot of the illuminated scene from the knowing of each photon impinging a given SPAD cell of the SPAD detector array, and of the related angle of illuminated dot of the scene, the data being locally processed such that they are blanked filtered, averaged both in time and/or in neighboring SPAD cells clustered in macrocells, compressed and/or transmitted to an imaging part.

The 2D version uses the same advanced mechanically optimized system and could use SPADs or any other suitable type of light sensor.

The present invention also describes means for acquiring 3D or 2D data of specific targets of various sizes and at different distances from the imager:

- Use a mode-locked laser generating ultra-short pulses and variable gain erbium (or other rare earth, energy storage) amplifiers to globally illuminate specific target areas with a constant illumination density. This will provide a very high optical peak power, high timing resolution achieved with the lowest total optical energy, safest operation, best resolution, and shortest acquisition time for 3D measurements.
- Use high resolution (e.g., 600 by 600 pixels) 3D SPAD sensors as described in a co-pending patent application entitled "Methods and devices for generating a representation of a 3D scene at very high speed", filed the same date at the same Applicant, for the same goals.
- Use quickly moving, electro-mechanically controlled, optical lenses to optimize both the size of the illuminated areas and the best focusing of the returning light on the sensors.
- Use a quickly rotating (around a vertical axis) and tilting mirror on top of the lens group to select the angular direction and elevation of the target.
- Use air bearings to obtain a wear-free, "infinite life", constantly active aiming mechanism.

The combined use of those opto-electronic/electronic/mechanical elements will provide a powerful way of acquiring on demand 2D/3D data on a high number of different targets within a short time, in a 360° range, with various elevations and a high variety of distances.

BRIEF DESCRIPTION OF THE DRAWINGS

The features and advantages of the present invention will become more apparent from the following detailed description when taken in conjunction with the accompanying drawings in which.

DETAILED DESCRIPTION

Figure 1:
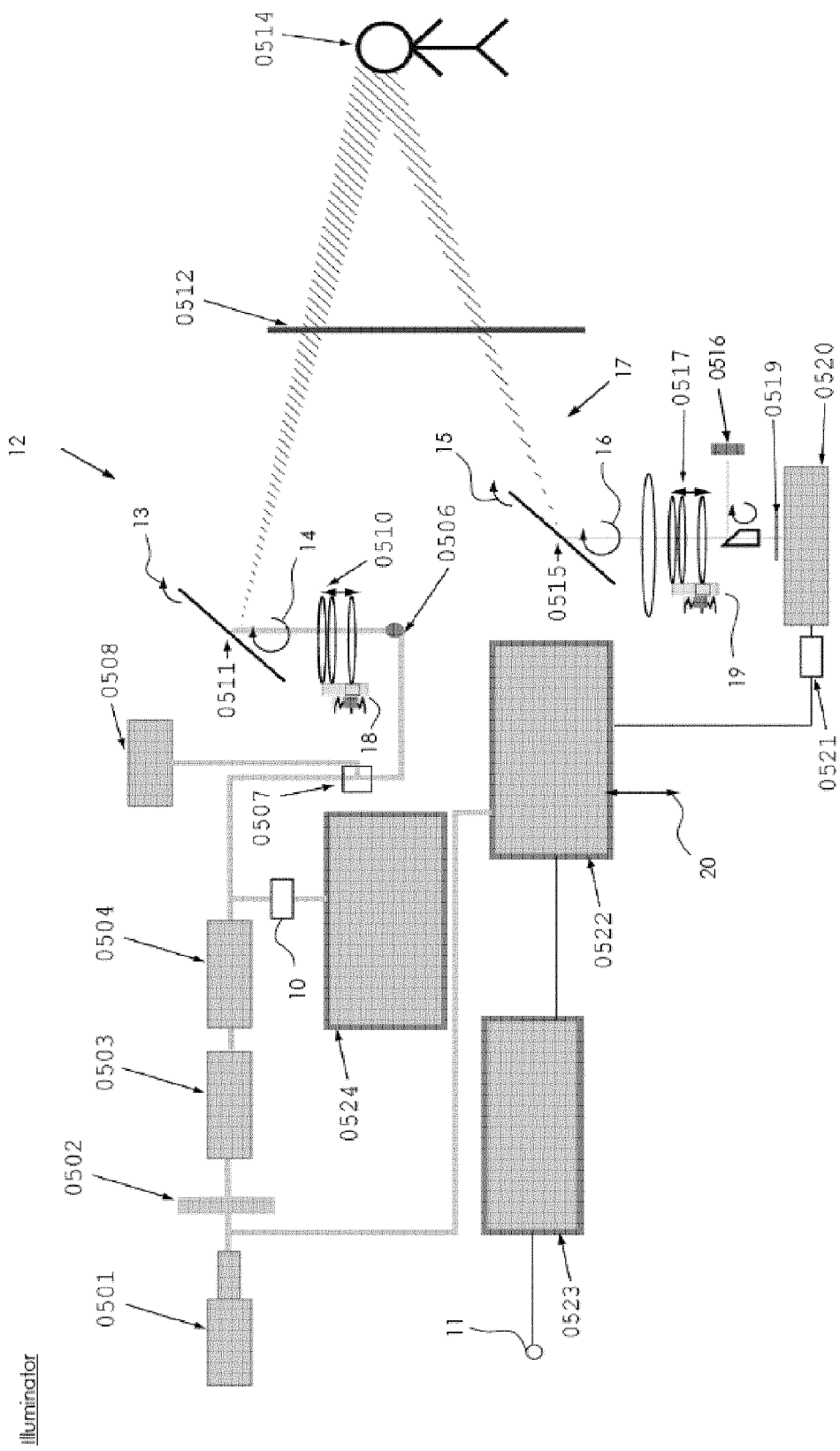
FIG. 1 illustrates a block diagram of a real-time imager of a preferred embodiment of the present invention.

As it is represented in FIG. 1, the real-time imager of the present invention comprises at least one illuminator and at least one receiver. The optical detector part is represented here at 0520. It is part of the receiver. A main function of the receiver is to convert the output of the detector into an electronic image signal which can be displayed on a screen, and/or stored or transmitted to a computer which uses the imaged scene. Some front-end image processing will also be done as part of the receiver.

The Illuminator

The illuminator produces an illumination pattern on the scene. That pattern is generated with a series of ultra-short laser pulses from at least one source. The means for generating ultra-short laser pulses comprise:

- preferably a mode-locked laser source which continuously generates low-jitter pulses with a controlled low optical average power;
- a modulator which forms programmed sequences of the generated pulses by removing some of the pulses;
- possibly a semiconductor amplifier (capable of varying the degree of amplification with high speed) amplifying the low-power pulses transmitted by the modulator; and
- an erbium-doped fiber amplifier further amplifying the pulses from the semiconductor amplifier to obtain high-power pulses;
- an optical device for sending the amplified laser pulses to the target.

Mode-locked lasers are preferred sources for the inventive imager, but other cheaper sources are possible. For multi-wavelengths, a separate source is needed for each wavelength, and for best efficiency a synchronization is needed between mode-locked lasers, through a special mechanism. Non-synchronised sources are also possible but are less efficient.

Notably, the modulator is controlled with a microcontroller which applies predetermined strategies to form a series of laser pulses. In one embodiment, some pulses of the series are suppressed such that one or more packets of pulses are formed. It is also noted that each pulse has an ultra-short duration, of the order of a few picoseconds (limited by the detector jitter). Many laser pulses can be emitted toward the scene within at least one frame with a duration of less than 1 millisecond. In that way, it is possible to acquire at least a thousand frames/images per second.

Therefore, a live video is achievable. The optical and mechanical means for generating an illumination pattern (preferably of Gaussian format) comprises a viewfinder with these mains parts:

- a two-axis moving mirror; and
- a fast variable focusing optical device, which are both electronically controlled according to predetermined procedures involving the illuminator and the receiver of the imager.

The corresponding controller is programmed to form the series of pulses for each image frame.

The real-time imager of the present embodiment is enclosed in a box with a circular glass opening for the optical parts of both the illuminator and the receiver.

In the FIG. 1, the illuminator of the real-time imager comprises also one or more mode-locked infrared lasers 0501. In other embodiments, the mode-locked infrared laser is replaced by a different laser which can generate low-jitter pulses. In one embodiment, the infrared laser is emitting at wavelengths around 1.5 μm and with repetition frequencies in the GHz range. Each laser will be followed by a modulator 0502 which is electronically controlled and is capable of suppressing some or all pulses to form a temporal pulse series as programmed with a dedicated controller. That controller is electrically connected to the modulator 0502 for modulating the pulse power. The modulator is controlled by a dedicated fast electronic circuitry. The modulator will typically reduce the pulse emission frequency to the range of tens of megahertz. However, the operation of the mode-locked laser at multi-GHz frequencies allows to build it with a compact size. The illuminator of the real-time image also comprises a semiconductor optical amplifier 0503. It allows to implement a fast automatic gain control which may be required for the SPAD matrix to stay in a non-saturated regime. An erbium optical amplifier 0504 can further amplify the laser power level, leading to very high peak powers.

The illuminator of the real-time imager may also comprise a wavelength combiner 0507 which combines the emission from various sources: infrared for 3D, infrared for 2D video, visible light or any other source for the receiving sensors. The average power will generally be low (like LED emitter type), due to safety restrictions (IR), and optionally used with a pseudo-stroboscopic signal format as a deterrent for intruders.

In one embodiment, after the wavelength combiner 0507, a beam shaper 0506 is inserted in the optical path. Also, a power sensor is added to measure the emitted power of the laser pulses. A controller devoted to the illuminator is connected to the power sensor and is programmed such that the received power is rapidly adapted according to any programmed constraints. In a preferred mode, control of the total emitted power is done independently for each angular direction according to data stored in a memory of a power profile of the illuminated scene.

The illuminator of the real-time imager may contain an electro-mechanical zoom 0510, allowing to adjust the size of the square (or rounded) illumination to the target distance. To that end, it comprises a control means 19 with position sensors and actuator that will adjust the focus and/or the size of the illumination.

The illuminator of the real-time imager also contains a viewfinder mechanism 12 with a tilting and rotating mirror 0511. The mirror 0511 will direct the light generated at the laser source to the right azimuth 14 and elevation 15 toward the scene to be imaged. Azimuth and elevation provided by the viewfinder 12 are controlled by both actuators and position sensors to ensure a correct illumination of the scene and its restriction to a defined area. Alternatively, the viewfinder 12 could use a Risley prism mechanism. As it will be seen below, the viewfinder 12 is generally not shared between the illuminator and the receiver.

The Receiver

The real-time imager of the present invention contains a receiver based on a SPAD detector array 0520. A SPAD detector array contains, on a single CMOS integrated circuit, a plurality of photodiodes, each of them exploiting the single photon avalanche phenomenon. The SPADs are built on a CMOS integrated circuit and are associated in a 2D matrix form. In the 3D detail real-time imager of the present invention, the SPAD detector array works in a manner which is coordinated with the illuminator. In a preferred embodiment, an additional stream of laser pulses as generated within the illuminator is optically transferred to the receiver by means of an optical fiber. The receiver can utilize the timing information of these pulses for the time-of-flight measurements.

The SPAD detector array comprises a plurality of single photon avalanche diodes which register incoming photons. TDCs (time-to-digital converters), which are initiated using timing information from the pulses as obtained via the fiber from the illuminator, are used for obtaining the time-of-flight data.

Another invention, as described in co-pending patent application of the same applicant and filed the same day, entitled "Methods and devices for generating a representation of a 3D scene at very high speed", describes essential components of a powerful imaging device. The SPAD detector array of that other invention is built on an integrated circuit which embeds:

the SPAD detector array;
on-chip data processing means operating on the detected signals at the SPAD detector array itself, to ensure both a high image resolution and/or the capability to represent 3D movements of objects of a real scene;
additional digital signal processors for further global processing of signals from the local DSPs at the detector cell level.

Such an arrangement is made such that images of detailed scenes can be acquired and/or movements in a scene can be recorded with a high resolution and/or at a high frame rate as required for video streams, for example.

In a preferred embodiment of the 3D detail real-time imager of the present invention, the SPAD detector array is designed for a mean acquisition time below one millisecond for a complete frame with a resolution of 100 by 100 to 1200 by 1200 or more 3D pixels with an expected depth precision in the sub-millimeter range. However, there will be trade-offs between such qualities when the movement of objects in the frame must be acquired.

The receiver of the real-time imager is enclosed in the same enclosure 0512 as the illuminator. In such an embodiment, the real-time imager is built in a single apparatus comprising in the same enclosure at least one illuminator and a receiver part. In another embodiment, each of the illuminator and the receiver have their own boxes with a transparent opening for exchanging light with the exterior.

The receiver of the real-time imager also comprises a local electronic controller 0522 supervising the real-time movement of the light collector 0515-0520 formed with a viewfinder, which is an optical and mechanical means for capture a flow of light from the illuminator and reflected from the illuminated scene.

The receiver of the real-time imager comprises then a viewfinder 13, which comprises a tilting and rotating mirror 0515 collecting the faint light reflected by the target and directing it to a zoom mechanism 0517. The zoom mechanism 0517 is provided with a control means 19 with position sensors and actuator that will adjust the focus according to the distance of the target. Alternatively, the viewfinder 13 could use a wear-free tripod mirror mechanism or a Risley prism mechanism. An alternative sensor 0516 like a video CCD could receive light via a monogon rotating dichroid mirror in the optical path. A simple dichroic filter could be also used. The possibility of insertion of the above-mentioned monogon is dependent on an optimized zoom design. This mechanism will rotate the target image on 2D sensors 0516. This rotation will have to be corrected by software in order to compensate aberrations. The alternative sensor 0516 is connected to a control board 0522 with a data link 20.

The receiver of the real-time imager comprises a 3D sensor 0520 in matrix form, protected by an infrared filter 0519. It collects the faint 1.5 μm infrared photons on its light-sensitive surface. Large optics are used to direct the sparse photons to each SPAD detector cell of at least a SPAD detector array which measures their time of arrival. According to an important aspect of the invention, the time of arrival is measured by an electronic means embedded in the integrated circuit on which the SPAD detector cell is made. The electronic means for capturing a timestamp runs an estimate of the time of arrival on the basis of both a reference time related to a first pulse emitted at the illuminator, and of the conversion of a time of the event detected when a photon impinges a SPAD detector cell into the digital domain. Such an electronic means captures a timestamp of the pulse from which a photon is captured at the SPAD detector array with a large dynamic range (32 bits) and high precision at the picosecond level.

According to an aspect of the present invention, the arrival time of each received pulse is measured to capture a timestamp. When a pulse impinges a SPAD diode of the SPAD detector array, its timestamp is "aligned" with the other pulses' timestamps, and corresponds to the its position in the packet of pulses emitted and then reflected onto the objects in the scene. Knowing the timestamp of the pulse and/or of the packet of pulses received onto the SPAD detector array, and knowing the address of the SPAD diode which receives the said pulse, the receiver is provided with means to associate the pulse with a dot or voxel of the scene in 3D coordinates.

As it has been defined above the SPAS detector array comprises processing means, which apply one or more treatments to the detected signal of the SPAD detector array itself. Due to the fact that the processing means are embedded onto the same integrated circuit as that of the photon detectors, the speed of the various treatments is high. There is no bottleneck due to an external data link. As a first treatment, and to ensure a fast processing, an important aspect of the present invention relates to averaging of the detection events received by one SPAD diode at a given address in the SPAD detector array. Said averaging is executed by a local DSP which is integrated on the same integrated zone on the CMOS chip as the SPAD diode which receives the pulses.

Similarly, averaging the photons received from related pulses onto a group of SPADs, in close proximity is performed by other local DSPs which are also integrated onto the same CMOS chip as the SPAD detector. Combining both time averaging and spatial averaging leads to an enhanced sensitivity of the SPAD detector array but at a cost of data rate reduction. Furthermore, averaging being performed by local DSPs is very fast due to the fact that raw data are not transmitted to an external DSP. This feature combined with others allows the fast acquisition of detail images and/or the detection of moving objects.

After averaging, the processed data are compressed by a local DSP (it will remove the redundancy in the time and space domain in the 3D data), integrated onto the same CMOS chip as the SPAD detector array and its local DSPs, placed at every SPAD and at groups of SPADs. Such a compression reduces the quantity of data as they are transmitted from the SPAD detector array to external processors devoted to the use of the said data.

In a preferred embodiment, after extensive local processing and compression, the data will finally be directed to a global DSP 0521. That DSP uses the SPAD matrix for imaging the target with variable resolution depending on various circumstances such as the object distance and the number of photons available. The maximum resolution will use a single SPAD for each pixel. The averaging could use 4 to 36 or more SPAD elements to improve the depth resolution of each 3D pixel at the expense of spatial resolution An optional electrically controlled diaphragm could be used to optimize the depth of field.

The Global DSP 0521 will process all the compressed data from each active SPAD, perform more statistical correction/corrective actions, select the relevant data and transfer it to the real-time electronic controller. To this aim, said global DSP is preferably built on the same chip of the SPAD detector array using a known CMOS process. It contains a memory in which programs are stored. When a command of the main controller is sent to the global DSP, a program of the memory associated with the global DSP runs to execute one of the afore-mentioned operations. Due to the fact that the global DSP is integrated onto the same chip as the SPAD detector array, it is expected that the speed of the transfer of the data acquired with the SPAD detector array is optimized.

Two local electronic operation controllers 0522, 0523 will supervise the real-time management of the imager, controlling mainly: the modulator, the light amplifier, the zoom lenses, the 360° emitter, the 45° tilting mirror, the matrix SPAD detector array, the power management, and the data transfer. It will be sending the raw or semi-processed data to an external smart controller through a special board. A special safety mechanism will supervise in real time the total power emitted in each direction toward the scene and at all wavelengths. It will also generally check through an independent mechanism the effective movement of the mirrors in order to switch off the laser source in case that the scanning mechanism is not working properly. Such a special safety mechanism is ensured by a means for running a safety control of the illuminator.

CCD sensors will optionally receive several wavelengths for 2D data from the target through a common optics together with light at other wavelengths for the 3D data. A dichroic (wavelength separating) mirror will separate light components with different wavelengths. The infrared light for 3D data will always be sent to the corresponding 3D sensor, whereas the other wavelengths can be sent to various 2D sensors. The 2D acquisition will possibly be done in successive phases, one for each wavelength to improve the sensitivity. Rotating filter wheels for selecting different wavelengths and variable focusing mechanisms (for each wavelength) (piezo-z positioning or variable lens movement) will optionally achieve the best image quality and sensitivity on a "neutral" large size CCD.

The operation of the 3D detail imager is briefly described hereinafter.

The mode-locked infrared lasers will continuously emit pulses at their natural frequency in the GHz range. In one embodiment, the illuminator comprises several mode-locked infrared lasers, each emitting at a predetermined wavelength. Each laser source is connected to an electro-optic cell or modulator 0502 connected to a central controller. According to commands from the operator and/or stored programs, a sequence of selected laser pulses is generated to illuminate the target at predetermined wavelengths.

The modulator 0502 comprises an input port, which commands the optical state of the modulator. In a first state, the modulator 0502 lets the light from the laser source 0501. In a second state, the modulator 0502 stops the light from the laser source 0501. The input port (not shown) of the modulator 0502 is connected to said central controller. According to a selected program from a set of stored programs, certain laser pulses from the laser source 0501 are transmitted, generally at a frequency compatible with the SPAD recovery time (e.g., 50 MHz). Those packets of pulses will allow the measurement of a complete frame. Those packets of laser pulses could have only 10 pulses when a calibrating mode is programmed using low level pulses, and as many as 20 000 pulses to acquire a complete scene.

The semiconductor amplifier 0503 will act continuously. Its amplifier gain will be controlled by a central controller according to the desired distance, measurement strategy and type of target. The used control program also implements a safety mechanism to provide redundancy.

In another embodiment, the imager will also be able to collect the landscape (360°) 3D data acquired with a continuous rotating viewfinder. This background supervision will be engaged continuously (interrupted only by power saving pauses and by detail scanning) and will provide an inexpensive alternative to a specialized landscape scanner. To limit the mechanical requirements on the rotating mechanism, "in-flight" (with no mechanical stops of the optical parts) capture can be done with high power, limited number of pulses preferably on large area surfaces (for change detection mainly) at various distances and with limited resolution. The packets of ultra-short laser pulses will be in the 1 μs range. A selected program from a set of stored programs in the central controller determines the rotation of the viewfinder which is combined with optional small movement of the zoom lenses to optimize the image sharpness at different distances.

In one embodiment, the image sensor based on a SPAD detector matrix is mounted on a support which is mechanically translated with a piezo-electric transducer, translating it in at least one determined direction at a given amplitude and frequency. Such a translation is controlled by the above-mentioned program to be synchronized onto the rotation of the viewfinder and onto the status of the optional movement of the zoom lenses.

A method of operating a 3D detail real-time imager as it has been described above is explained herein below.

In a first step, a general view of the scene is acquired at a given resolution on a 3D basis. Once these landscape 3D data have been acquired, a step of processing the acquired 3D data is performed at the central controller such that some interesting targets will be identified (generally by an external controller). When the detection of interesting targets is completed, a second step is started.

In the second step, a more detailed acquisition occurs based on a more exact knowledge of the expected distance of the targets acquired and/or analyzed at the end of the said first step. A first part of the second detailed acquisition step is a "verification" frame without blanking to correct the possible movement of the target and precision inaccuracies between the landscape and detail acquisitions.

In a second part of the second detailed acquisition step, a blanking signal is sent to the SPAD detector array which let the detector be activated only at times where reflected light can be expected based on the previous coarse acquisition in the first step of acquisition of the 3D landscape scene. Each blanking signal is applied to an enabling circuit associated with a SPAD cell so that the received photons when the blanking signal is high are not processed. In that way, random false counts can be suppressed in order to improve the data quality.

The viewfinder will first stabilize its position before allowing the precise launching of the optical signals on the proper target. An alternative will be to use "in movement" measurement by using slow movement of the optics instead of the complete stop. Another alternative is to use the known movement of the mirror within the mechanical settling time of the optic for interpolation The electronic supervision system will synchronize the viewfinder and the modulators to acquire a complete frame of the target data. At long distance, it will limit the number of complete frames to a few percent of the total maximum possible count in order to increase the maximum power aimed on target while keeping the imager "eye safe". It is noted that there is a risk for the eyes of a person illuminated with high-power laser pulses. An important aspect of the present invention is to limit the total power radiated onto the scene mainly to ensure eye safety. As a first level of protection, the total emitted energy per second is controlled and managed individually in each angular direction. At a second level of protection, the power is highly concentrated in time to let the system acquire non-blurred 3D images even for moving objects while keeping within safety limits. The illumination of the scene is performed several times at variable resolutions to progressively acquire data of the scene.

The pulses will be launched at an expected frequency of about 50 MHz. Generally, the repetition rate is optimized according to the SPAD recovery time. Pulses can be sent at a higher rate if the detector cells are organized in macro-cells containing multiple SPADs, because even if some SPADs have undergone an avalanche, other SPADs in the macrocell can still detect light. Even quicker acquisition could be done with multi-wavelength systems using one or more imagers operating at different wavelengths and running at the same time in parallel to enhance the speed of acquiring a frame.

The imager optics aimed at the target will collect this light and direct it to the SPAD detector array.

Each pixel at each frame will be individually identified by the electronic system. The multiple TDC's coupled with ultrafast counters, local data processing, compressors and DSP will provide the distance of each pixel. A few complete image frames (e.g., 3) will be acquired one after another to improve the signal-to-noise ratio of the frame signal by the use of sophisticated averaging.

An automatic gain control mechanism (AGC) will constantly optimize the emitted power level. The estimated distance to the target will provide the basic determination of the emitted power. The AGC can also compensate for the variation of air transmittance (fog) and target reflectance. The minimum power level needed to have most of the SPADs avalanching will be used. The blanking mechanism of (first come first take) SPAD avalanching (as explained below) could be used. Alternatively, a starved-photon regime will be preferred if the power requested to saturate the SPADs will be too large or if this will bring too few pulses in a packet.

In one embodiment, the AGC is performed based on the measured received power. The parameter to be controlled is the saturation level of the SPAD detector array, in order to not saturate the SPADs during a measurement.

In one embodiment, the so-called "round-robin SPAD avalanching" solves the dead time problem related to the Geiger mode of operation of single photon avalanche diodes. The problem is that after each avalanche, the voltage at the PN junction of a SPAD must be reduced for some time, so that the avalanche is stopped. Therefore, after being hit by a photon, the SPAD diode is not responsive for some dead time. A remedy given in the present invention uses a blanking mechanism on the SPAD detector array. If used in a group of four SPAD cells, for example, each having a single SPAD with its own controller, only one of the four SPADs is ready to avalanche at one time; whereas the other SPADs are inactivated by the blanking mechanism. The SPADs are sequentially activated in order to always have one active SPAD. The resolution and sensitivity are also divided by 4, the number of diodes of the SPAD group of cells.

The size and the resolution of the macro-cells could be changed quickly. In some modes of operation of the imager, there will be periodic changes of resolution between "high resolution" 3D capture used as "reference" frames and "movement" frames used as "delta corrector" for improving the movement estimation between the high resolution frames. The DSP will provide interpolated high resolution 3D data. A variable cell size inside the same frame could also be used for special 3D data capture.

The size of the macrocells (i.e., the number of cells belonging to one macrocell both in horizontal and vertical directions) can be rapidly adjusted according to the circumstances. The first task performed with a macrocell is an averaging in space of the events detected at each SPAD detector cell of the macrocell at one time. A second task performed with a macrocell is an averaging in both in space and time of the events detected at each SPAD detector cell of the macrocell during a given duration of time. Therefore, the macrocell behaves as it if a unique light detector of large size.

The rapidly adjusted resolution of the macrocell is inversely proportional to the variable number of SPAD detector cells averaged inside it.

According to a basic idea at the core of the present invention, the size and resolution of the SPAD detector array are periodically changed to optimize the trade-off between the speed of acquiring a frame of the illuminated scene and its resolution. Such an optimization is programmed in a strategy stored in a memory of strategy programs. The selected strategy is run on a global controller which sends orders to both the illuminator and the receiver. At the receiver, the macrocell size and the resolution of the SPAD detector array is rapidly changed according to the performed strategy. The more SPADs inside each macrocell, the more sensitive and fast is the acquisition, but the lower the spatial resolution. If there is movement, acquisitions with higher detail are made from time to time by the global controller of the imager. Intermediate acquisitions are less detailed. All this saves time and global emitted energy. Therefore, it is possible to cope with eye safety constraints and other security constraints in using a pulsed laser.

In one embodiment, a special 3D data acquisition is performed when different constraints apply to different parts of a scene. For example, if the detailed imager of the present invention is used for acquiring a biometric image of the face of a user, the person's nose could be imaged at high spatial resolution, whereas the eyes are imaged at high speed because they are moving fast. Therefore, the global controller of the detailed imager is programmed such that the part of the illuminated field which is identified as the part of the nose is acquired with a first strategy which emphasizes the resolution. A second strategy is performed onto the second part of the eyes which optimizes the speed of acquiring a frame.

The local DSPs of the SPAD detector matrix will perform the above macro-cell averaging in a context of possible photon starvation where some pulses emitted will not provide sufficiently many photons to be detected by each SPAD or even each macro-cell. The averaged data of the complete frame will be transferred to the supervisor (see below) or managed locally.

In one embodiment, a local DSP is built on a SPAD detector cell. Such a SPAD detector cell comprises a SPAD diode, its quenching circuitry, a time-to-digital converter to receive an electrical signal from the quenching circuit which refers to the detected event when a photon impinges the diode, and a local DSP. A given DSP on a SPAD cell works with other local DSPs to perform in real time the averaging of events received at each SPAD cell of a given macrocell. The averaging is done with an order determined by a global DSP which also runs a program for cell size optimisation as it has been described above.

In the above, a supervisor is either a part of a specially crafted version of the receiver circuits of the detail real-time imager of the present invention, or an external controller with chips dedicated to that use. It manages locally the averaging of data of the complete frame.

The DSP will detect the unexpected intrusion of a body in the beam path by detecting the sudden change of distance values on a significant (more than 1/50) portion of SPADs, especially on the sides of the frame. The global DSP executes a program initially stored in a memory of programs. The program ensures a strong limitation of the emitted power in the specific angular direction of the object to the minimum needed to detect whether the object (human being incidentally evolving at the edge of imaged zone) is still there. Such a program cooperates with a program performed automatically at the imaging part which cooperates with the 3D detailed real-time imager of the invention. The program performed at the imaging part is a recognition analyzer which detects within the image converted from a previously acquired frame with the detailed real-time imager that a human being is entering in a zone where laser pulses are directed by the illuminator of the imager. Such an analyzer is able to perform a dynamic analysis which reveals the speed and direction of the moving body.

The expected number of pulses emitted in an average frame will be between 1 and 100 000 pulses. This will provide between 1 and 100 000 pulses detected by each macro-cell. The choice of the number of pulses will be based on the safety limit concerning individual pulse energy and also the limit of the laser amplification system. The spatial averaging will be also limited, especially at high resolution (tradeoff between spatial resolution and averaging). This will require a larger temporal averaging.

In one embodiment, the number of pulses per frame is requested by the central controller 0524. Any other strategy determining parameters such as the number of pulses can be chosen according to the required trade-off between speed and resolution.

The 3D acquisition process could be supplemented with a simultaneous 2D acquisition process with infrared light, and possibly visible light. Between the full 3D acquisitions, there will be low power, limited resolution movement acquisition (power trade-off between movement and static 3D data). The 2D data will be combined with the high and low resolution 3D data to provide interpolated high resolution texture-mapped images to human supervisors.

In an embodiment, the imager acquires static 3D data in a large range of frame sizes and resolutions: from details in the middle of a face to a complete outline of a silhouette or a complete car. Because safety limits are involved, the selection of a frame size and/or resolution is made under a program performed at the central controller of the imager.

The illuminator can also adapt the illuminated zone and/or the frequency and recurrence of the pulses, taking into account data obtained from preceding image frames. The illuminator and the receiver are working in a coordinated manner. The receiver is informed by the illuminator of the parameters defining the illuminated area. Those parameters comprise the number of pulses, the format of the pulse packets, and the direction of each illuminating beam generated by the illuminator.

A safety/power optimization system will maximize in real time the static and dynamic 3D and 2D data acquisition to maximize the quantity of data and the precision of data acquired in a certain horizontal angular range while maintaining the maximum allowed beamed power. External controllers will be able to change the priority rate of each activity.

Image Quality

There will be several image quality levels reflecting the various expectations of the acquisition time and the spatial resolution (number of pixels) and the depth resolutions. Any intermediate values are possible, but three broad categories should be emphasized:

full quality images: the number of pulses used for improving the depth resolution will be important (in the thousands or tens of thousands, depending on the jitter level of the detector). The full spatial resolution will be used. The pulse number will be limited by the laser beam safety limits (relaxed at close distance) and speed considerations.

medium quality images: the number of frames will be more important and compatible with movement capture (opposed to capture of targets in movement). Full spatial resolution will be used, but depth resolution (number of averaged pulses) will be limited by consideration of speed and limited by the laser beams safety limits.

fast movement capture: the number of frames will be maximum or optimum (save for data transfer speed limits). Macro-cell averaging will be used extensively to increase the pulses speed. Depth resolution will be limited by the relatively small number of pulses used for averaging.

Optic and Mechanic of the Variable Zoom and Rotating Mirror

The matrix sensors could be used for a large range of distance, capturing data in an area of a size of tens of meters. Considering the complexities of installation and the cost of installing a lot of limited range imagers, there is a requirement for a large range of distance acquisitions for the fast matrix sensors. As the resolution of each sensor is not infinite and the size of details expected at each distances is constant, the only solution is to provide an adaptation optic that will collect the light from the targets and direct it on the surface of the sensors. This adaptation will be variable for each distance, thus a continuously executed zoom will be needed. The system here described is mostly conceived for a 3 to 25 meter range adaptation, but nothing precludes other ranges to be used.

There is the same kind of requirement for a large angular range around the detail imager. The high speed of acquisition of the 3D sensors will let the system make several acquisitions within one second. Another requirement is the limited power safely beamed on a single target or more precisely single limited angular range.

The angular range of common optical systems is generally small concerning both azimuth and elevation. The known variable zoom systems generally use complex mechanics to control the positions of lenses. The only alternatives are the motorized zoom, the periscope, and the panoramic camera. They are unable to attain the goals of the present invention.

The new optic and mechanical system will have to reach several goals:
  sending collimated laser beams to targets with variable angular size;
  collecting the reflected light at the matrix sensors;
  using generally separate optics for both tasks;
  providing a large range of measurement distances while achieving a high optical quality and limiting the number of moving elements;
  using periodic calibration of the optical settings on fixed external elements instead of "perfect" optics to save cost and space;
  performing a 360° horizontal angular range of measurement;
  performing around +/−15° of tilting on the elevation;
  acquiring several positions of measurement by second;
  controlling a continuous and smooth scanning of the 360° azimuthal range;
  no wear or maintenance requirement after billions of movements and several years.

Figure 2:
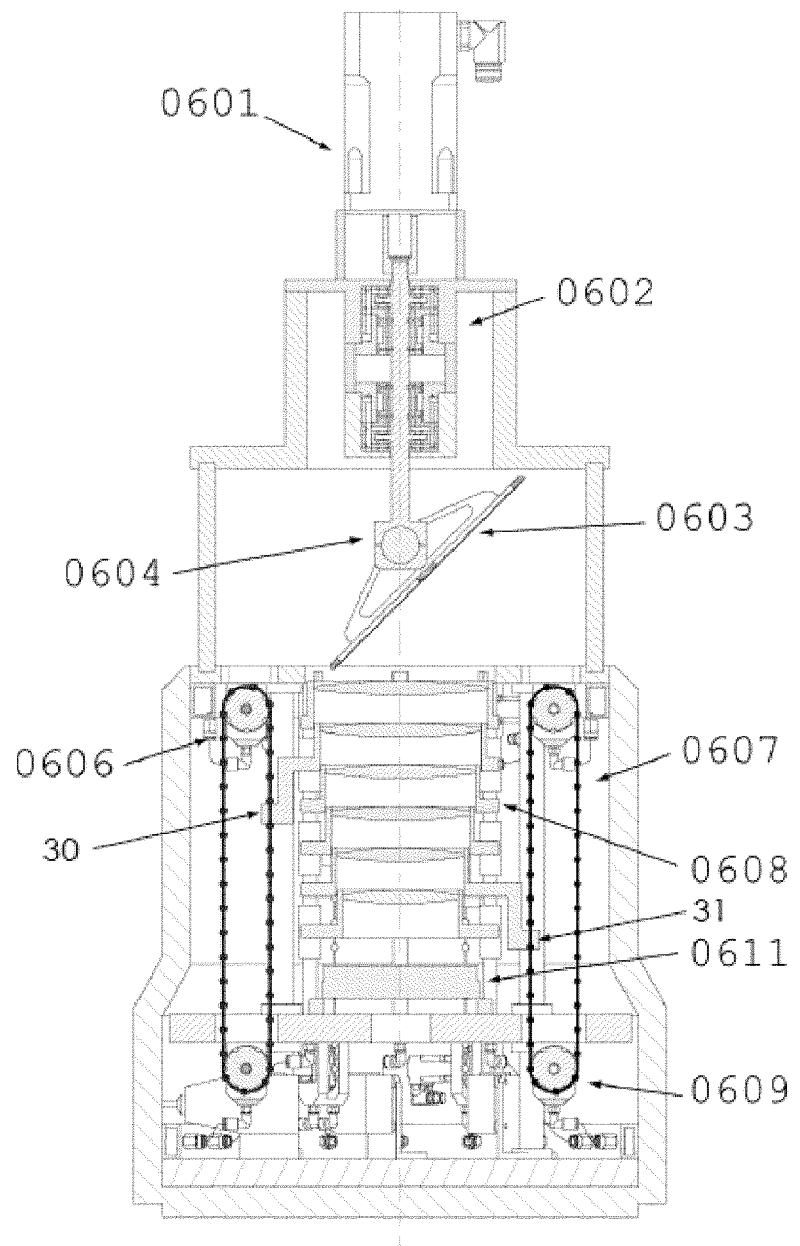
FIG. 2 illustrates a schematic view of a viewfinder used with another embodiment of the present invention.

The new system, as it is illustrated in FIG. 2, uses optomechanical novelties to reach those goals:
  combination of a fast moving zoom lens system with a rotating and tilting mirror on top of them;
  systematic use of air bearing for most of the bearing functions. To limit the problems associated with moving (air-feeding) cables, the air supply to the lenses will be transmitted through the center of the rotating axis. A complex offbeat positioning of elongated lens support is provided to limit the risk of air loss through non covered air bearings holes;
  additionally special elastomeric joints placed inside the column at air exits to limit the loss of air by stopping air leak when no counter pressure (moving element) is in front of the air bearing (see below)
  linear movement of the lenses;
  movement of the lenses provided by rotating motor and cables or linear motors or voice coils;
  combination of a mirror on an air bearing and a rotating tilting mechanism;
  protection of the whole system in a sealed enclosure, possibly overpressure with a neutral gas (no contamination or air bearing and optics).

In FIG. 2, the optics and the mechanics of the variable zoom and of the rotating mirror use:
  0601: a servo-motor controlling the horizontal azimuth of the mirror;
  0602: air bearing supporting the mirror in all its quick movements;
  0603: an ultra-light mirror aimed in azimuth and elevation to the target point;
  0604: a tilting electro-pneumatic actuator that will drive the mirror at the chosen elevation with strong damping capabilities;
  0606: top motor and bottom motor 0609 controlling the movement and tension of the transport cable attached to the lenses 0608; and
  0611: 2D and 3D Sensors as already described in the FIG. 1 above.

In an embodiment not shown, cheap interferometers are also mounted onto the viewfinder for controlling the movement of any moving part of the viewfinders and connected to respective controllers. Motor 0601 is coupled to a shaft which is supported in the air bearing 0602. The shaft is mounted at its opposite end to the tilting electro-pneumatic actuator 0604 which is mounted onto the mirror 0603. The mirror 0603 rotates around the motorized shaft such that light which is reflected from the illuminated scene and passes through a glass enclosure of the viewfinder of the FIG. 1, is reflected toward the various sensors.

The glass enclosure has a cylindrical shape around the central axis of the viewfinder at FIG. 2. It is mounted between the casing of the air bearing 0602 and the motor 0601, and the casing of the remaining (below) of the viewfinder.

A lens set 0608, configured as an electronically controlled zoom, is mounted below the mirror 0603 and comprise a plurality of lenses, each of them being mounted onto a cylindrical part engaged with other similar cylindrical parts. A first cylindrical part 30 is connected to a transport cable 0606 which is driven with an actuator electronically controlled (not shown). A last cylindrical part 31 engages with another transport cable 0608 which is driven with an actuator electronically controlled (not shown). A central processor (not shown at FIG. 2, see electronic board 0524 at FIG. 1) controls the position of the two cylindrical parts to ensure a focus control and/or a zoom control of the collected light from the mirror 0603 onto the sensors 0611. The cylindrical parts which carry the other lenses are driven by the movements of the first and the last cylindrical parts 30 and 31.

Elastomeric Bearing Jets to Reduce Air Flow Loss when Uncovered

Hydrostatic (aerostatic or self acting are other terms) air bearings usually have small jets typically of the order of 0.5 mm diameter and often positioned in a pocket typically of the order of 3 mm diameter and 0.2 mm depth.

The vertical air bearings that support the lenses will have their jets in the shafts, with bushes that move up and down thus uncovering some of the jets. Air could then flow out of the jets to no use. Although this loss could be acceptable, one way to reduce this loss would be to use elastomeric jets that deform due to the pressure across them such that when the bush is over the jet and the pressure in the clearance between the shaft and bush is ~40% of the supply pressure (typical design range=30-50%) then the elastomeric jet is at its nominal say half open condition: when the bush moves down or up the shaft away and uncovers this jet the pressure difference across the jet becomes equal to the full supply pressure which deflects the elastomeric closing down the flow to a negligibly small flow rate. This very small flow rate is essential in order for the jet to re-open when the bush returns.

Use a Tilting, Fully Rotating Mirror on Top of the Focusing System to Direct the Emitted Beams and Select the Measurement Area The mirror is supported by an air bearing which provides it with an axis of rotation (continuous and stepping motion) to allow the viewing direction to move around the horizontal plane. At least one motor, which is electronically controlled by a controller (described above), is provided to actuate the axis of the bearing by which the mirror is supported.

The other movement or tilting of the mirror in the other plane is actuated with another motor electronically controlled by a controller (described above), such that the view point, which is illuminated with the illuminator, moves vertically. The tilting movement of the mirror can be achieved as follows:

The mirror is supported on an air bearing axis that is hydrostatic in operation with air being fed down the inside of the rotating (or stepping) shaft. It would be most convenient to have the bearing feed jets (through which the air enters the bearing clearance) in the shaft with the rotatable bush around it holding the mirror. The air is fed into the center of the shaft using a slip ring that is most conveniently situated near or even inside one of the radial (journal) bearings that support that shaft; slip ring air feeds are known technology: positioning the slip ring inside one of the radial air bearings may reduce parasitic air flow losses.

The mirror needs to tilt by about 30 degrees around its air bearing axis, this can be achieved in two ways:
I) it is provided an electric motor—in one embodiment, of the stepper type—that is electrically powered using contactless, wireless or transformer slip rings. The zero contact between the air bearing shaft and stationary parts means that there is a capacitive coupling. The capacitive coupling is used to transfer information of the speed of rotation and/or of the angular position of the axis of the mirror to a rotating electronic control system.
II) variations in air pressure that is being fed down the center of the shaft. The mirror axis air bearing will operate over a wide range of supply pressure so that a variation of this pressure could be used to control the position of the mirror.

In spite of a control based on variations in air pressure, the rotation of the mirror is controlled with a pure electric control. In an embodiment, an optional rotating filter and mirror block is equipped with a means for ensuring a fine vertical sharpness positioning for the sensors by piezo electric actuator.

It is expected that a computer will use directly 3D data for recognition and treatment, but human being will probably require 2D pixel data. The constraints of dispersion of the optics will generally limits the other wavelengths mainly to sub 0.9 µm near infrared specialized CCD sensors.

A solution for using multiple wavelengths is the use of a simple monogon mirror at the bottom of the zoom lenses to switch between different sensors. The mirror could be dichroic and transmit only the 1.5-µm infrared light to a rounded matrix sensor.

Depending on the type of optics used for the zoom lens system, it will be advantageous to use as a fast sharpness adjustment mechanism a fine tuning vertical (depth) positioning for the 3D and 2D sensors instead of moving heavy lenses.

Figure 3:
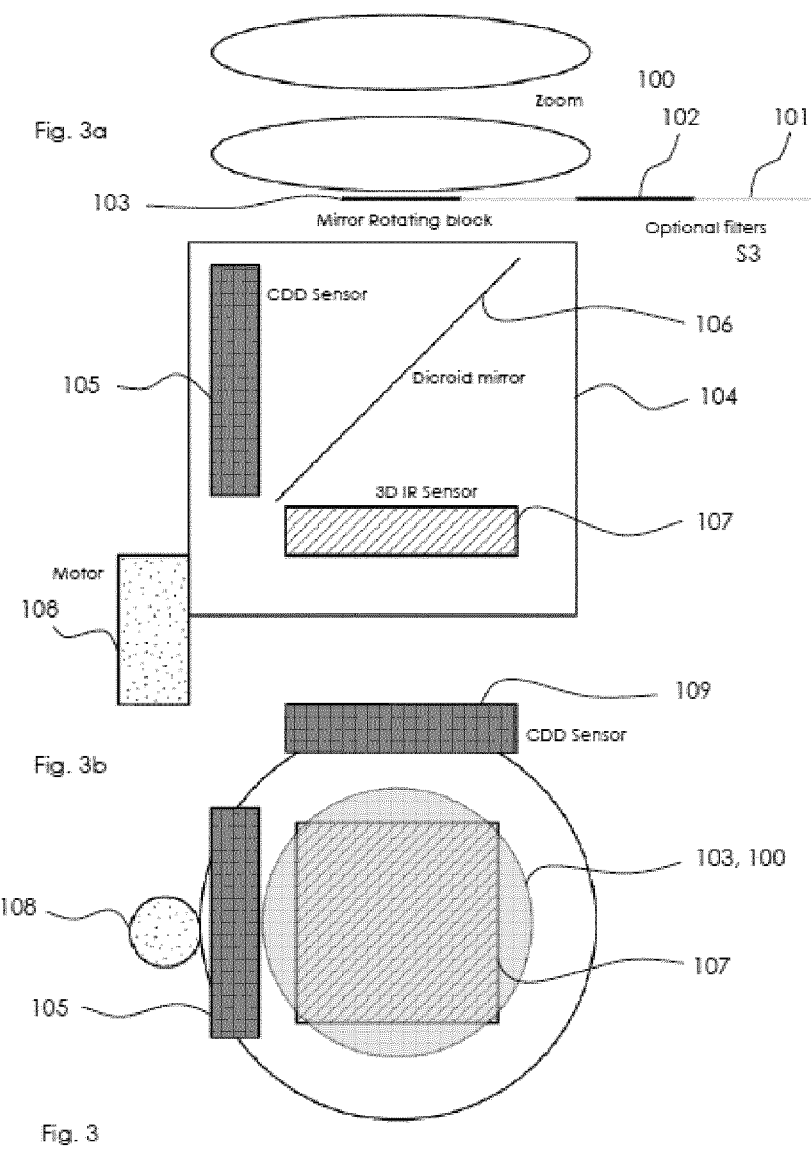
FIG. 3 represents two views of a part of a viewfinder in another embodiment of the present invention.

In FIG. 3, an example is described to explain this feature of the invention. FIG. 3a is direct view and FIG. 3b is a top view.

A zoom optics 100 are aligned onto a central axis of the viewfinder. A plate carrying some optional filters 102, 103 is interposed at the output of the zoom along the optical path. A motor (not shown) allows selection of the appropriate filter 102, 103 under control of a dedicated controller (not shown).

A mirror rotating box 104 is aligned with the central axis. It contains a dichroic mirror 106 and at least one CCD sensor, which is a 2D image sensor operating with visible light, and at least a 3D infrared sensor 107, preferably a SPAD detector array as it has been described above.

In FIG. 3b, the same parts as in FIG. 3a show the same reference numerals and are no more discussed. A second CCD sensor 109 is provided which images another wavelength of the light, different of that of the first 2D CCD sensor 105. A motor 108 which is controlled with a dedicated controller actuates the mirror rotating box 104 such that it is performed a switching between one or more 2D sensors.

When switched, the motor 108 actuates the mirror rotating box 104 to position one of the two 2D CCD sensors in the field of view transmitted through the dicroic mirror 106. Therefore, the 2D CCD sensors 105 and 108 are alternatively activated. Further, the controllers used with the SPAD detector matrix receive the information of the orientation of the SPAD detector matrix to correct its data.

Electronic Boards

The real-time electronic boards (see 0522, 0523, 0524 at FIG. 1), which are provided to support the various controllers described above, simultaneously manage the following subsystems: modulator, light amplifier, zoom, viewfinder, SPAD matrix, DSP, power management, internal data transfers, and temperature calibration.

An independent board is in charge of safety (i.e., eye safety). In such an embodiment an independent board comprises means for managing a safety control of the illuminator.

Another independent board manages: security, local and remote access and external data transfer to the central controller through an Ethernet-type link 11. In such an embodiment an independent board comprises means for managing: security, local and remote access and external data transfer to the central controller through an Ethernet-type link 11.

The real-time electronic board manages the acquisition activity of the imager. As an example, it performs the choice of target distance, size of the illumination field, number of pulses per frame and/or per light beam, the size of macrocells of the SPAD detector array, the number of frames, safety constraints notably in power and duration, etc. In such an embodiment an independent board comprises means for managing: the tactical acquisition activity of the imager.

The real-time electronic board manages the maximum optical power and image precision of each frame by changing the operational parameters of the modulator and the semiconductor amplifier. More frequent pulses of limited power will allow for a high precision. Pulses with a lower repetition rate but with maximum power will be suitable for higher distance measurements. In such an embodiment an independent board comprises means for managing: the maximum power/precision of each frame by changing the operational parameters of the modulator and the semiconductor amplifier.

The real time electronic board comprises means for operating the imager in several capture modes, provided by a capture mode selector which is a part of the real-time electronic board:

1) Make "background" Landscape acquisition, although dedicated landscape scanners may be faster. If no other "landscape" imager is active, the "detail" imager can be used as a landscape scanner between two detail data captures. This will use a constantly rotating (during the measurement) detail imager.
2) Crude detail acquisition. This is the first mode that uses pulses organized in a frame format. In this mode, only a limited number of pulses are aimed on the target to measure its outline. To limit the interference risks, a complete round-trip time could be allowed between packets. The power level of each packet could be increased. The mechanical positioning of the receiving optical system will also be fine tuned.
3) Full detail acquisition. In this mode, the maximum density (in the time domain) of packets is used in all the frame area, already known by previous acquisition data. The power of each packet is limited to the required level in order not to be in a photon-starved regime, if possible.
4) Large area, detailed acquisition. In this mode, several single complete frames will be juxtaposed horizontally and vertically with a little overlapping. The viewfinder will manage the aiming juxtaposition. The movement of the target will be estimated and compensated in the complete large frame. The imager will generally use the data treatment capability of the SPAD detector arrays to manage the data processing at high speed.

Safety Concepts

The safety of the living "targets" is a critical aspect of the invented detail imager. The goals of long distance, high depth and pixel resolutions require high-power pulses. The IEC/EN 60825-1 (2007) standard defines the acceptable limits.

To ensure such safety concepts, the methods of operating the 3D detail real-time imager of the present invention comprise the steps of:

selecting a wavelength in the 1.5-µm infrared region (providing an inherent eye safety);

selecting the shortest possible lowest energy measurement packets of ultra-short laser pulses generated at the illuminator;

selecting limitations on the number of measurement packets of ultra-short laser pulses generated at the illuminator per second in a given angular range and not for the whole surrounding. This number will change with the emitted power and then with the distance;

adapting the maximum power emitted to the size of the surface area illuminated;

real-time supervision of the emitted power by an "independent" subsystem inside the imager. This supervision subsystem will control the emitted power and also the movement of the mirrors in charge of the angular distribution. It will act on the laser modulator and, in case of emergency, on the light amplifier;

self checking all security systems to be active permanently. Its default mode will be failure. This means blocking the laser, the modulator, the amplifier and aiming the viewfinder on a safe zone;

managing the whole transmitted energy (at all wavelengths) to the target in the same second;

using a landscape-mode measurement before any detail measurement to minimize the emitted power during a detail measurement;

using a periodic non-blanked pulse measurement to detect an intrusion in the measurement field, especially from the sides. An intrusion is detected by the presence of any target in the measuring path at distance 90% closer than the expected target distance;

reducing drastically the power of all beams in a limited angular range such as 10° when an intrusion is detected (this means a possible human presence);

Using the remaining low power to detect the continuing presence of the intrusion and returning to normal level once removed;

detecting a possible proximity (e.g., 0.5 meter) presence by use of capacitive sensors if the other measures are not efficient to detect a safety problem in this distance range.

Figure 4:
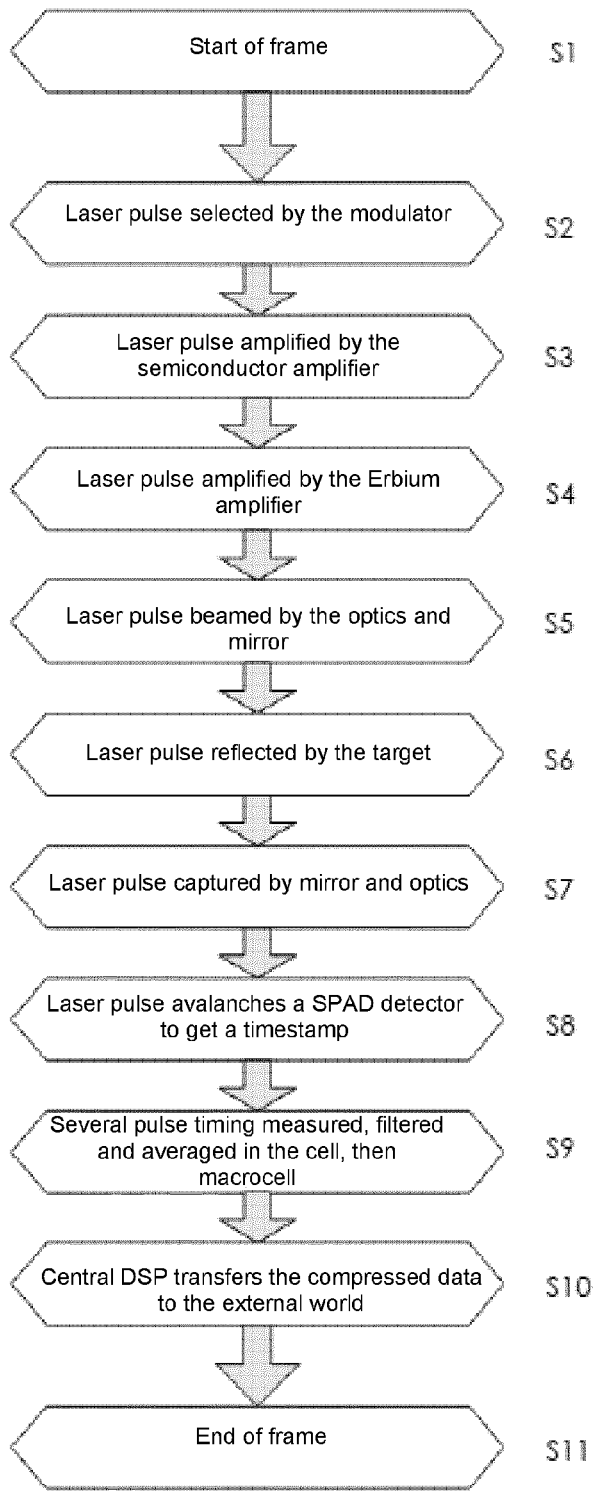
FIG. 4 illustrates a method of operating a 3D detail real-time imager of the present invention.

In the FIG. 4, it is represented a method of operating a 3D detail real-time imager according to the present invention.

A frame is initiated at the imager in resetting during a step S1 the various parts of the imager so that a new image can be acquired. In a step S2, a pulse sequence is formed by the modulator. Such a selection is operated under a dedicated controller. It applies the various strategies ordered to form an appropriate series of ultra-short laser pulses.

At a step S3, the generated laser pulse selected with the modulator is amplified by the semiconductor amplifier.

At a step S4, the first amplified laser pulse is also amplified by the erbium amplifier. Then, at step S5, the amplified laser pulse is beamed by the optics and the mirror of the illuminator of the imager.

At a step S6, the emitted laser pulse is reflected by the target. Then, at step S7 the reflected laser pulse is captured by the optics and mirror of the viewfinder dedicated to the receiver of the 3D detail real-time imager.

At a step S8, the laser pulse avalanches a SPAD detector with a certain address in the matrix, to get a timestamp related to the emission time of the first emitted laser pulse of a pulse frame. The combination of the address of the SPAD and of the timestamp allows to calculate the 3D coordinates of the dot which has reflected the laser pulse onto the scene. This calculation also takes into account the angular position of the laser beam, which depends on the position in azimuth and elevation of the various mirrors both of the illuminator and of the receiver.

At step S9, several pulse timings are measured, filtered and averaged both in time and/or in space, neighboring SPAD detectors, preferably clustered in macrocells. In an embodiment, the data after the processing of the data at the SPAD detector cell level of at the macrocell level are locally compressed preferably at a macrocell.

At step S10, the global DSP compresses the data after they have been averaged and transfers it to the external part of the chip. The external world is represented with 3D data. A 2D display or a computer running a program designed to use the compressed 3D data generated by the receiver of the imager.

In another embodiment, several 3D detail real-time imagers are monitoring the same scene in a coordinated manner to compose complex images of the scene. In particular, the acquisitions of images are sequenced such that data can be shared between the various imagers. Particularly, calibration of the scene is performed on each imager such that a first frame is acquired at a first low resolution and details of the acquired frame are then acquired in subsequent frames at other resolutions and/or position of the acquired zone in the scene.

Such a calibration avoids the emission of full power onto an unknown scene and allows to use optimized settings for each imager, for both the illuminator and the receiver.

The invention claimed is:

1. A real-time imager that provides at least one of 3D and 2D detail, comprising:
    an illuminator comprising:
    means for generating at least one series of ultra-short laser pulses generated with at least one laser source emitting at least one given wavelength,
    a receiver comprising:
    optical and mechanical means for receiving a flow of light from the illuminated scene when the said illuminator is operative; and
    means coupled to the said optical and mechanical means for receiving a flow of light and for generating a signal representing the targeted scene on the basis of the reflected light from the scene impinging at least one single-photon avalanche diode (SPAD) detector array; said means generating a signal representing the targeted scene and being coupled to an imaging part under at least one programmed controller,
    wherein the ultra short laser pulses are generated through an electronically controlled modulator to form packets of pulses into the said series of pulses, under control of a means for controlling said means for generating at least a series of ultra short laser pulses; and wherein the illuminator comprises optical and mechanical means coupled to said means for generating at least one series of ultra-short laser pulses for producing at least a predetermined spatial pattern of illumination of a scene onto at least a restricted area in at least one of in azimuth and in elevation,
    wherein said laser source emitting at a given wavelength comprises a mode-locked laser source operating in the infrared spectral region to provide ultra-short pulses, preferably with a duration of the order of a picosecond, and at a low average power level, optionally coupled to an intermediate semiconductor optical amplifier to amplify low power pulses to a medium power level, then to an rare-earth-doped, preferably erbium, amplifier to amplify the medium power to a high peak power.

2. The real-time imager according to claim 1, further comprising a wavelength combiner which collects the emission from various sources of illumination comprising at least: infrared for 3D, infrared for video, visible light or any other source providing light adapted to the said receiver.

3. The real-time imager according to claim 1, wherein the optical and mechanical means for generating an illuminating pattern comprises a viewfinder which comprises:
    a movable mirror; and
    fast variable focusing optics;
    which are both electronically controlled according to pre-determined procedures involving the illuminator and the receiver of the imager.

4. The real-time imager according to claim 3, wherein the viewfinder comprise also a light homogenizer receiving the light from the amplifiers, and the optics are adjusting the size of an illuminating beam of a selected section, square or round, to the target distance.

5. The real-time imager according to claim 3, wherein the viewfinders of both the illuminator and the receiver are enclosed in the same or different casing with a transparent opening.

6. The real-time imager according to claim 3, wherein each optical and mechanical part requiring a bearing function cooperates preferably with at least an air bearing with air supplying through the center of axis.

7. The real-time imager according to claim 6, wherein said air bearing comprises a plurality of jets with at least one bush which moves up and down relatively to the center axis due to the pressure onto the jets and dispositive to save air leak and require no moving cables.

8. The real-time imager according to claim 6, wherein a optical and mechanical means comprises a variable zoom and a rotating mirror which use at least one of the group consisting of:
    a servo-motor controlling the horizontal azimuth of any mirror;
    air bearing supporting any mirror in all its quick movements;
    an ultra light mirror aimed in azimuth and elevation to the target point;
    a tilting electro-pneumatic actuator driving the mirror at the chosen elevation with strong damping capabilities;
    a top motor and bottom motor controlling the movement and tension of a cable attached to the lenses of the zoom; and
    interferometers controlling the movement of any moving part of the viewfinders and connected to respective controllers.

9. The real-time imager according to claim 8, further comprising an electric motor, that is electrically powered using wireless transmission or a rotating transformer; a wear-free contact between the air bearing shaft and stationary parts is provided preferably by means of a capacitive coupling, which is used to transfer information of the at least one of the speed of rotation and the angular position of the axis of the mirror to a rotating electronic control system.

10. The real-time imager according to claim 8, further comprising some variations in air pressure that is being fed down the center of the shaft, the mirror axis air bearing operating over a wide range of supply pressure such that a variation of this pressure controls the position of the mirror.

11. The real-time imager according to claim 8, wherein zoom optics are aligned onto a central axis of the viewfinder, a plate carrying some optional filters is interposed at the output of the zoom along the optical path, a motor allowing selection of the convenient filter under control of a dedicated controller, a mirror rotating box is aligned onto the central axis and contains a dichroic mirror and at least a CCD sensor, which is a 2D image sensor operating in a visible range of light, and at least a 3D infrared sensor, preferably a single-photon avalanche diode (SPAD) detector, and a motor to rotate the mirror rotating box to rapidly connect the designated CCD sensor at the control of a dedicated controller.

12. The real-time imager according to claim 1, wherein optical and mechanical means for receiving a flow of light at the receiver comprises a viewfinder with optics having a tilting and rotating mirror collecting the faint light reflected from the target and directing it to a zoom mechanism that will adjust the focus to the distance of the target.

13. The real-time imager according to claim 1, further comprising CCD sensors to receive several wavelengths for 2D data from the target through common optics together with the 3D data acquired in the infrared range with said single-photon avalanche diode (SPAD) detector array, a dichroic mirror to separate the wavelengths such that the 3D data capture is always available and the 2D acquisition run at successive phases, one for each wavelength to improve the sensitivity, some rotating filter wheels for selecting different wavelengths and variable focusing mechanisms.

14. The real-time imager according to claim 1, wherein an alternative sensor is switched in by a monogon rotating dichroic mirror in the optical path, thus rotating the target image on 2D sensors, this rotation being corrected in software to obviate some aberrations.

15. The real-time imager according to claim 1, further comprising at least a real-time electronic board provided to support various controllers to manage the following subsystems: modulator, light amplifier, zoom, viewfinder, single-photon avalanche diode (SPAD) matrix, DSP, power management, internal data transfers, and temperature calibration.

16. The real-time imager according to claim 15, wherein an independent board comprises a means for controlling safety of the illuminator.

17. The real-time imager according to claim 15, wherein an independent board comprises means for managing security, local and remote access and external data transfer to a central controller through an Ethernet-like link.

18. The real-time imager according to claim 15, wherein a real-time electronic board comprises means for managing the tactical acquisition activity of the imager.

19. The real-time imager according to claim 18, wherein the real-time electronic board comprises means for managing the maximum power/precision of each frame by changing the operational parameters of the modulator and the semiconductor amplifier.

20. The real-time imager according to claim 18, wherein the real time electronic board comprises means for operating the imager in different capture modes, provided by a capture mode selector between:
1) a Landscape acquisition (light landscape, plain landscape imagers);
2) crude detail acquisition;
3) full detail acquisition;
4) large area, detailed acquisition.

21. A real-time imager that provides at least one of 3D and 2D detail, comprising:
an illuminator comprising:
means for generating at least one series of ultra-short laser pulses generated with at least one laser source emitting at least one given wavelength,
a receiver comprising:
optical and mechanical means for receiving a flow of light from the illuminated scene when the said illuminator is operative; and
means coupled to the said optical and mechanical means for receiving a flow of light and for generating a signal representing the targeted scene on the basis of the reflected light from the scene impinging at least one single-photon avalanche diode (SPAD) detector array; said means generating a signal representing the targeted scene and being coupled to an imaging part under at least one programmed controller,
wherein the ultra short laser pulses are generated through an electronically controlled modulator to form packets of pulses into the said series of pulses, under control of a means for controlling said means for generating at least a series of ultra short laser pulses; and wherein the illuminator comprises optical and mechanical means coupled to said means for generating at least one series of ultra-short laser pulses for producing at least a predetermined spatial pattern of illumination of a scene onto at least a restricted area in at least azimuth or in elevation,
wherein the single-photon avalanche diode (SPAD) detector array of the receiver is built on an integrated circuit which embeds:
the single-photon avalanche diode (SPAD) detector array;
processing means which apply one or more treatments to the detected signal at the single-photon avalanche diode (SPAD) detector array itself, to ensure at least a high image resolution or the capability to represent 3D movements of objects of a real scene;
digital signal processors distributed from the cell level built around a single single-photon avalanche diode (SPAD) with a local DSP, a group of neighbouring single-photon avalanche diode (SPAD) cells clustered in a macrocell having its proper DSP, to a global level DSP for the overall of the treatments generated at the local DSPs.

22. The real-time imager according to claim 21, wherein optical and mechanical means for receiving a flow of light at the receiver comprises a viewfinder with optics having a tilting and rotating mirror collecting the faint light reflected from the target and directing it to a zoom mechanism that will adjust the focus to the distance of the target.

23. The real-time imager according to claim 21, wherein the viewfinders of both the illuminator and the receiver are enclosed in the same or different casing with a transparent opening.

24. A method for acquiring 3D scenes from such at least one of a 3D detail real-time imager 3D and 2D detail real-time imager, comprising:
an illuminator comprising:
means for generating at least one series of ultra-short laser pulses generated with at least one laser source emitting at least one given wavelength,
a receiver comprising:
optical and mechanical means for receiving a flow of light from the illuminated scene when the said illuminator is operative; and
means coupled to the said optical and mechanical means for receiving a flow of light and for generating a signal representing the targeted scene on the basis of the reflected light from the scene impinging at least one single-photon avalanche diode (SPAD) detector array; said means generating a signal representing the targeted scene and being coupled to an imaging part under at least one programmed controller,
the ultra short laser pulses being generated through an electronically controlled modulator to form packets of pulses into the said series of pulses, under control of a means for controlling said means for generating at least a series of ultra short laser pulses; and the illuminator comprising optical and mechanical means coupled to said means for generating at least one series of ultra-short laser pulses for producing at least a predetermined spatial pattern of illumination of a scene onto at least a restricted area in at least azimuth or in elevation, wherein the method comprises steps of:
generating time series of at least a wavelength of a time series of ultra-short power laser pulses;
forming beams of ultra short power laser pulses generated at different angles for illuminating a restricted area of a scene to be imaged, both in azimuth and elevation;
receiving reflected laser pulses onto at least a SPA single-photon avalanche diode (SPAD) detector array and deriving 3D coordinates of each illuminated dot of the illuminated scene from the knowing of each photon impinging a given single-photon avalanche diode (SPAD) cell of the single-photon avalanche diode (SPAD) detector array, and of the related angle of illuminated dot of the scene, the data being locally processed such that they are blanked filtered, averaged at least one of in time and in neighboring single-photon avalanche diode (SPAD) cells clustered in macro-cells, and at least one of compressed and transmitted to an imaging part.

25. The method according to claim 24, further comprising a step of selecting the number of generated pulses in each of a plurality of packets of the said time series of ultra-short power laser pulses according to a selected strategy of illuminating the scene.

26. The method according to claim 24, further comprising a step of selecting at least one of a laser and a light source of a given wavelength to illuminate the scene.

27. The method according to claim 24, further comprising a selected rotation of mirrors of at least one of said viewfinders and the state of controllable zooms of the said viewfinders.

28. The method according to claim 24, wherein in a first step, a general view of the scene is acquired at a given resolution on a 3D basis, for acquiring some interesting targets, then in a second step, a detailed acquisition occurs based on the exact knowledge of the expected distance of the targets acquired or analyzed at at least one of the end of the said first step and on the basis of other means of knowing the target distance could be used like optical settings or knowledge by other means.

29. The method according to claim 28, wherein a first part of the second detailed acquisition step is a verification frame without blanking to correct the possible movement of the target and precision inaccuracies between the landscape and detail acquisitions.

30. The method according to claim 29, wherein at a second part of the second detailed acquisition step, a blanking signal is generated toward the single-photon avalanche diode (SPAD) detector array which is enabled so that only packet of received pulses corresponding to an approximate position of each illuminated dot of the target is precisely acquired, said blanking signal being generated on the basis of the coarse acquisition at the first step of acquisition of the 3D landscape scene and applied to an enabling circuit associated with a single-photon avalanche diode (SPAD) cell so that the received photons when the blanking signal is high are not processed.

31. The method according to claim 24, wherein the emitted power level is constantly optimized on the basis of an automatic gain control mechanism.

32. The method according to claim 24, wherein the size and the resolution of the macro-cells of the single-photon avalanche diode (SPAD) detector array is changeable.

33. The method according to claim 24, wherein a step of detecting the intrusion of a foreign body is performed at high speed using optimal energy and time mainly at the edges of the said restricted area of illuminating.

34. The method Method according to claim 24, wherein a 3D acquisition process is supplemented or substituted by a simultaneous 2D acquisition process in at least one of the IR and visible ranges.

35. The method according to claim 24, further comprising a selection between three or more image qualities comprising:
    a full quality images;
    a good enough quality images; and
    a fast movement capture.

36. The method according to claim 24, further comprising at least one of the following steps:
    collimating laser pulse beams on variable angular size targets;
    collecting the imaged reflections of those pulses to the matrix sensors;
    using preferentially separate optics for both tasks;
    providing a large dynamic of measurement distances while keeping optical quality high and limiting the number of moving block;
    using periodic calibration of the optical settings on fixed external elements instead of perfect optic to save cost and space;
    performing a 360° horizontal angular range of measurement;
    performing +/−15° of tilting on the elevation;
    acquiring several positions of measurement by second;
    controlling a continuously and smoothly scanning of the 360° angular range.

37. The method according to claim 24, wherein, to ensure safety of living target, the method further comprises at least one or more of the following steps:
    selecting a wavelength in the 1.5 µm IR wavelength, providing an inherent eye safety;
    selecting the shortest possible lowest energy measurement packets of ultra-short power laser pulses generated at the illuminator;
    selecting limitations on the number of measurement packets of ultra-short power laser pulses generated at the illuminator in a second of time in a given angular range only, wherein this number will change with the emitted power and then with the distance;
    adapting the maximum power emitted to the size of the surface area illuminated;
    real-time supervising the emitted power by an independent subsystem inside the imager, wherein this supervision subsystem will control the emitted power and also the movement of the mirrors in charge of the angular distribution;
    self checking all security systems to be active permanently;
    managing the whole transmitted energy, in all wavelengths, to the target in the same second by an individual imager or a group of imager coordinated explicitly or by using self healing optimization;
    preferentially using a landscape-mode measurement before any detail measurement to minimize the emitted power during a detail measurement;
    using a periodic non-blanked pulse measurement to detect an intrusion in the measurement field, from the sides, wherein an intrusion is detected by the presence of any target 90% farther than a few meters from the expected target distance;
    reducing all beams power in a limited angular range of 10° angular range direction when an intrusion is detected; and
    detecting a possible proximity presence by using a proximity detector if the other measures are not efficient to detect a safety problem in this distance range.

38. The method according to claim 24, wherein a frame for an image acquisition is controlled with one or more of the following steps:
    resetting the various parts of the imager;
    selecting at least a laser pulse by the modulator according to a given strategy ordered to build convenient time series of ultra-short power laser pulses;
    amplifying the selected pulse by the semiconductor amplifier;
    amplifying said amplified laser pulse is also by the Erbium amplifier;
    beaming said ultra-short power laser pulse by the optics and the mirror of the illuminator of the imager;
    reflecting said laser pulse by the target;

capturing said reflected beam by the optics and mirror of the viewfinder dedicated to the receiver of the 3D detail real-time imager;

avalanching photons of said reflected beam onto at least one single-photon avalanche diode (SPAD) detector, a diode which is addressed onto the matrix form of the single-photon avalanche diode (SPAD) detector matrix, to get a timestamp related to the timestamp of the emitted laser pulse;

filtering, blanking, averaging at least one of in time and in space, neighbouring single-photon avalanche diode (SPAD) detectors, preferably clustered in at least one of in macro-cells and locally compressing; and compressing at a global level DSP of the data after they have been at least one of averaged and locally compressed and transferring it to the external world.

39. The method according to claim 24, wherein several 3D detail real-time imagers are clustered towards a same scene to compose complex images of scenes, wherein the acquisitions of images are sequenced such that data can be shared between the various imagers; each imager is calibrating that imager's scene acquisition in such way that a first frame is acquired at a first low resolution and details of the acquired frame and then subsequent frames are acquired at at least one of other resolutions and other positions of the acquired zone in the scene.

* * * * *